(12) United States Patent
Wang

(10) Patent No.: US 9,475,221 B2
(45) Date of Patent: Oct. 25, 2016

(54) METHOD OF PREDICING INJECTION MOLDING CYCLE TIME

(71) Applicant: The Procter & Gamble Company, Cincinnati, OH (US)

(72) Inventor: Sean Wang, Boston, MA (US)

(73) Assignee: The Procter & Gamble Company, Cincinnati, OH (US)

( * ) Notice: Subject to any disclaimer, the term of this patent is extended or adjusted under 35 U.S.C. 154(b) by 168 days.

(21) Appl. No.: 14/568,323

(22) Filed: Dec. 12, 2014

(65) Prior Publication Data

US 2016/0167295 A1    Jun. 16, 2016

(51) Int. Cl.
*B29C 45/76* (2006.01)
*B29C 45/00* (2006.01)

(52) U.S. Cl.
CPC ..... *B29C 45/00* (2013.01); *B29C 2945/76558* (2013.01); *B29C 2945/76561* (2013.01); *B29C 2945/76892* (2013.01); *G06F 2217/41* (2013.01)

(58) Field of Classification Search
CPC .................. G06F 2217/41; B29C 2945/76137
See application file for complete search history.

(56) References Cited

U.S. PATENT DOCUMENTS

| | | |
|---|---|---|
| 4,534,003 A | 8/1985 | Manzione |
| 4,555,614 A | 11/1985 | Morris et al. |
| 4,850,217 A | 7/1989 | Nunn |
| 5,088,911 A | 2/1992 | Kumazaki |
| 5,581,468 A | 12/1996 | White et al. |
| 5,815,397 A | 9/1998 | Saito et al. |
| 5,940,309 A | 8/1999 | White et al. |
| 6,136,235 A | 10/2000 | Saito et al. |
| 6,517,754 B1 | 2/2003 | Hehl |
| 6,572,796 B1 | 6/2003 | Gao et al. |
| 6,585,919 B1 | 7/2003 | Osawa |
| 6,684,118 B2 | 1/2004 | Wu et al. |
| 6,914,537 B2 | 7/2005 | Yoshinaga et al. |
| 7,974,818 B2 * | 7/2011 | Sakurai .................. B22D 46/00 703/2 |
| 2003/0135287 A1 | 7/2003 | Wu et al. |
| 2006/0012064 A1 | 1/2006 | Hutson et al. |
| 2012/0035891 A1 * | 2/2012 | Heitzer ............... B29C 45/7693 703/1 |

FOREIGN PATENT DOCUMENTS

WO    2013/090993    *  6/2013

* cited by examiner

*Primary Examiner* — Jill Heitbrink
(74) *Attorney, Agent, or Firm* — Ronald T. Sia; Kevin C. Johnson; Steven W. Miller

(57) ABSTRACT

The invention features, in general, a method for determining a target cycle time for an injection molded part. The method comprises the steps of ascertaining the solidified volume percentage ($V_n$) as a function of cooling time ($T_n$) data for solidification of an injection molded part and calculating a cooling speed indicator ($CSI_n$) for each data point, ($T_n, V_n$). The solidified volume percentage ($V_n$) as a function of cooling time ($T_n$) and solidified volume percentage ($V_n$) as a function of cooling speed indicator ($CSI_n$) are tabulated and used to determine a target cycle time.

13 Claims, 3 Drawing Sheets

METHOD OF PREDICTING INJECTION MOLDING CYCLE TIME

FIELD OF THE INVENTION

The present invention relates to cycle time for injection molding. Particularly, a method of predicting optimal injection molding cycle time is provided.

BACKGROUND OF THE INVENTION

Injection molding of parts made of thermoplastic material generally has three main phases: first, injection of material into a mold; second, packing and cooling of the material in the mold in forming the desired part, and third, ejection of the molded part from the mold. The molding cycle time is commonly referred to as the duration of time from the start of the injection phase to initiation of the ejection phase.

Ability to accurately predict molding cycle time is of paramount importance in injection molding, particularly since it relates directly to the production rate and part quality. When cycle time exceeds a desired range, the production rate is compromised. In some instances, the part may exhibit brittle failure during ejection due to excessively increased friction force. In addition, ejector pins can be damaged due to the friction force exceeding the maximum ejection force that can be withstood by the ejectors. Further, if the part is ejected prematurely when only a thin layer of polymer is solidified, ejection may cause permanent deformation leading to surface defects. For most injection molders, cycle time is estimated through molding trials which are costly and time consuming. It is even more difficult to determine a proper cycle time range for new materials due to lack of knowledge of the material behavior.

Production tooling for the injection molding process is very costly to build. Capital cost is linearly proportional to the cycle time; therefore, cycle time minimization is critical in product cost reduction. Modeling software can be used to optimize the molding process in the early design phase. Modeling software calculates temperatures, velocities, viscosities, shear rates, and pressures as a function of time. However, the cycle time prediction is still left for users to predict.

Consequently, a need exists for an innovation which will provide an effective approach to predicting an injection molding target cycle time that can be used to determine an optimal cycle time for an injection molded part.

SUMMARY OF THE INVENTION

The invention features, in general, a method for optimizing cycle time for an injection molded part. The method comprises the steps of ascertaining the solidified volume percentage $(V_n)$ as a function of cooling time $(T_n)$ data from $V_0 = 0\%$ to $V\text{total} = 100\%$ for solidification of an injection molded part and calculating a cooling speed indicator (CSIn) for each data point, $(T_n, V_n)$, where $$CSI_n = \frac{(Tn - Tn-1)/T\text{total}}{Vn - Vn-1/V\text{total}}.$$

The solidified volume percentage $(V_n)$ as a function of cooling time $(T_n)$ and solidified volume percentage $(V_n)$ as a function of cooling speed indicator $(CSI_n)$ are tabulated from (0.0) to (?,100%) and a Turning Point is determined. The Turning Point is the data point, $(CSI_n, V_n)_{\text{Turning Point}}$, having a minimum value defined by $$\sqrt[2]{(CSIn)^2 + (100 - Vn)^2}.$$

From the tabulated data, the cycle time $(T_n)$ corresponding to the solidified volume percentage $(V_n)$ at the Turning Point is the target cycle time $(T_n)_{\text{Target}}$ for the injection molded part. The target cycle time is used to determine the optimal cycle time for the injection molded part.

Alternatively, the method of optimizing cycle time for an injection molded part, further comprises the steps of using the solidified volume percentage $(V_n)$ as a function of cooling time $(T_n)$ data to produce a first graph of solidified volume percentage $(V_n)$ as a function of cooling time $(T_n)$ and using solidified volume percentage $(V_n)$ as a function of cooling speed indicator $(CSI_n)$ data to produce a second graph of the solidified volume percentage $(V_n)$ as a function of cooling speed indicator $(CSI_n)$. A Turning Point is determined on the second graph which is a data point defined by a solidified volume percentage $(V_n)$ and a cooling speed indicator $(CSI_n)$ having a minimum distance to a data point defined by solidified volume percentage $(V_n) = (V\text{total}) = 100\%$ and $CSI = CSI_0 = 0$ wherein $$\text{distance} = \sqrt[2]{(CSIn)^2 + (100 - Vn)^2}.$$

The target cycle time is determined by finding the cycle time on the first graph corresponding to the solidified volume percentage $(V_n)$ at the Turning Point on the second graph.

BRIEF DESCRIPTION OF THE DRAWINGS

While the specification concludes with claims particularly pointing out and distinctly claiming the subject matter which is regarded as forming the present invention, it is believed that the invention will be better understood from the following description taken in conjunction with the accompanying drawings.

DETAILED DESCRIPTION OF THE INVENTION

Figure 1:
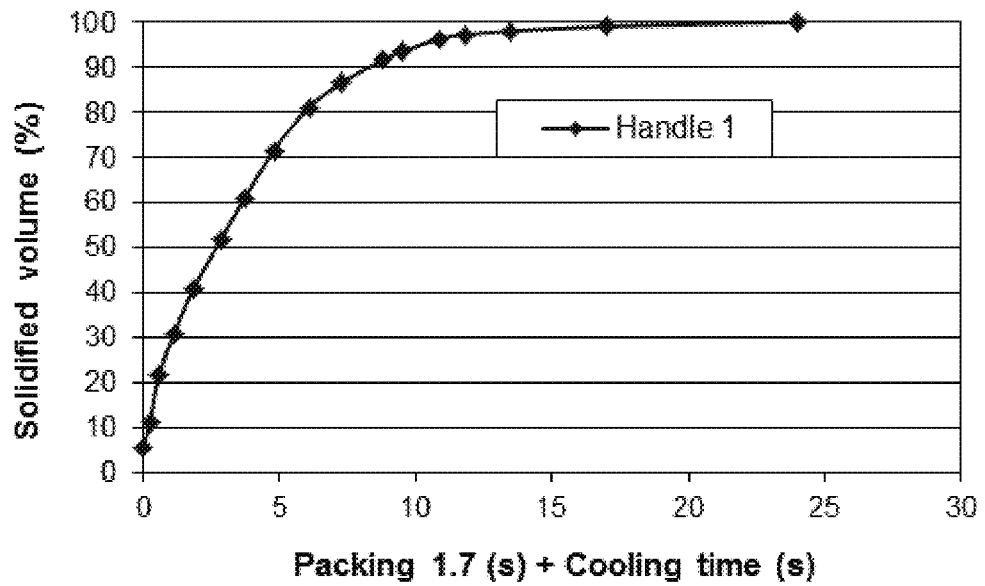
FIG. 1 is a graph of percent solidification versus cooling time of injection molded handle 1.

The present disclosure includes methods of simulating injection molding of injection molded parts. Embodiments of the present disclosure can at least assist in predicting a target cycle time for the injection molded part. As a result, the cycle time of the injection molded part can be optimized.

Computer aided engineering (CAE) is a broad area of applied science in which technologists use software to develop computer based models of real world things. The models can be used to provide various information about the physical behavior of those real world things under certain conditions and/or over particular periods of time. With CAE, the interactions of the computer based models are referred to as simulations. Sometimes the real world things are referred to as a problem and the computer based model is referred to as a solution.

There are several major categories of CAE. Finite element analysis (FEA) is a major category of CAE, in which models of mechanical components and/or assemblies are used to predict stress, strain and other mechanical behaviors. Computation fluid dynamics (CFD) is another major CAE category, in which models of fluids (e.g. liquids and/or gases) are used to predict pressure, flow, temperature, and other fluid and/or thermal properties. Still another major category of CAE is fluid structure interaction (FSI), which models the physical behavior of fluids in relation to solid objects. There are also a number of other categories of CAE.

Some aspects of CAE can also relate to various Computer Aided technologies, sometimes collectively referred to as CAx. CAx includes a number of technologies, such as Computer Aided Design (CAD), Computer Aided Manufacturing (CAM), and Knowledge Based Engineering (KBE).

Commercially available software can be used to conduct CAE. Abaqus, from SIMULIA in Providence, R.I., and LSDyna from Livermore Software Technology Corp. in Livermore, Calif., are examples of commercially available FEA software. Fluent, from ANSYS, Inc. in Canonsburg, Pa., and Flow3D, from Flow Science, Inc. in Santa Fe, N. Mex. are examples of commercially available CED software. LSDyna is also an example of FSI software. CAE software can be run on various computer hardware, such as a personal computer, a minicomputer, a cluster of computers, a mainframe, a supercomputer, or any other kind of machine on which program instructions can execute to perform CAE.

CAE software can be applied to a number of real world things, such as injection molded parts. SIGMASoft is a CAE software that can be used to optimize the molding process in the early design phase of an injection molding process. SIGMASOFT considers the thermo and fluid properties of the injection molded part and calculates temperatures, velocities, viscosities, shear rates, pressures, etc. as a function of time. However, the cycle time prediction of the injection molded part is still left for users to interpret. By leveraging SIGMASOFT's output a method was developed and applied to predict the cycle time for injection molded plastic parts. The method has been found to provide an estimation of cycle time, and also identify where to focus in order to reduce cycle time for an injection molded part.

An injection molded razor handle was used to find a practical way of predicting cooling time. However, any number of injection molded parts could be used. The production cooling time was compared to the cooling time predicted by the injection molding software SIGMASOFT revealing that the solidification starts off very quickly and slows down dramatically as it approaches the 100% solidification.

The graph shown in FIG. 1 shows the solidified volume percentage ($V_n$) as a function of cooling time ($T_n$) data from $V_0$=0% to $V_{total}$=100% for solidification of the injection molded razor handle (handle 1). As evidenced from the graph, a Turning Point exists where the solidification slows down significantly. The Turning Point can be used to determine the target cycle time for the injection molded part.

The solidification rate for an injection molded part can be determined by the relation dv/dT. It has been determined that the inverse of the solidification rate can be used to calculate a relationship referred to as cooling speed indicator ($CSI_n$). Cooling speed indicator, ($CSI_n$), is a dimensionless parameter that can be calculated for each data point, ($T_n$,$V_n$), where $$CSI_n = \frac{(Tn - Tn-1)/Ttotal}{Vn - Vn-1/Vtotal} \quad (1)$$

From the relationship for Cooling Speed Indicator in Equation (1), when $CSI_n$ equals 1, a "balanced" solidification process exists where solidifying 1% of the volume requires 1% of the total solidification time. When this value is smaller than 1 the solidification is fast since it takes less than 1% of the total time to solidify 1% of the volume. When it is larger than 1, the solidification is slow, taking more than 1% of the total time to solidify 1% of the volume. By plotting the solidified volume percentage as a function of CSI a curve is produced where the Turning Point used to determine the target cycle time for the injection molded part becomes more apparent as evidenced from the plot shown in FIG. 2.

Figure 2:
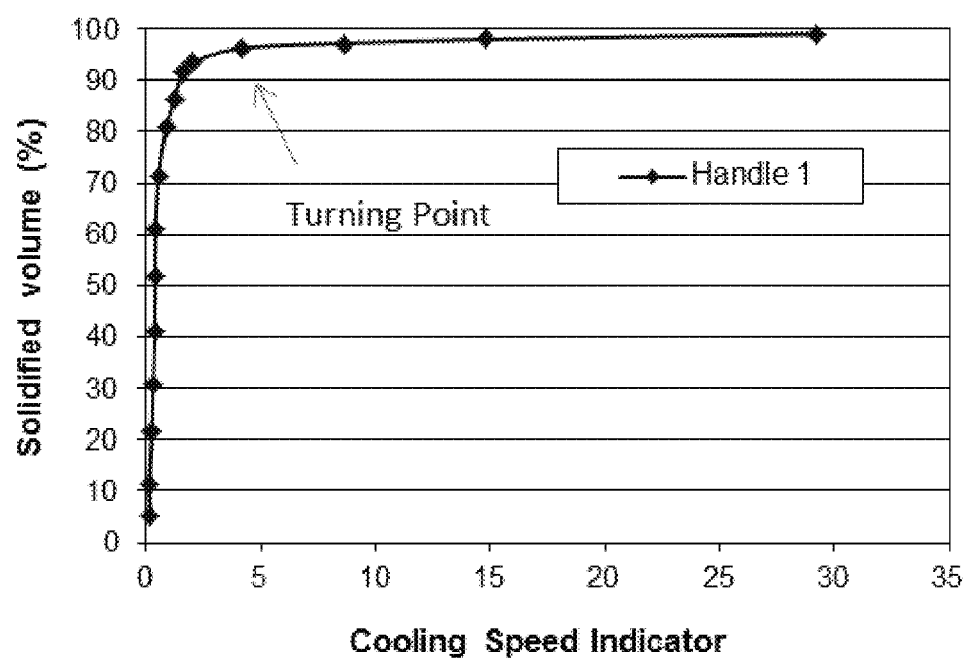
FIG. 2 is a graph of percent solidification versus cooling speed indicator for injection molded handle 1 identifying the turning point.

The Turning Point is the mid-point of the corner of the curve in FIG. 2. The actual Turning Point is the point ($CSI_n$,$V_n$) closest to the point (0,100). From the solidified volume percentage ($V_n$) as a function of cooling speed indicator ($CSI_n$) data from (0,0) to (?,100%) the actual Turning Point, ($CSI_n$,$V_n$)$_{Turning\ Point}$, is determined as the minimum distance defined by $$\text{Distance} = \sqrt[2]{(CSIn)^2 + (100 - Vn)^2} . \quad (2)$$

From the data, the cycle time ($T_n$) corresponding to the solidified volume percentage ($V_n$) at the Turning Point is the target cycle time ($T_n$) for the injection molded part. The target cycle time is used to determine the optimal cycle time for the injection molded part.

Figure 3:
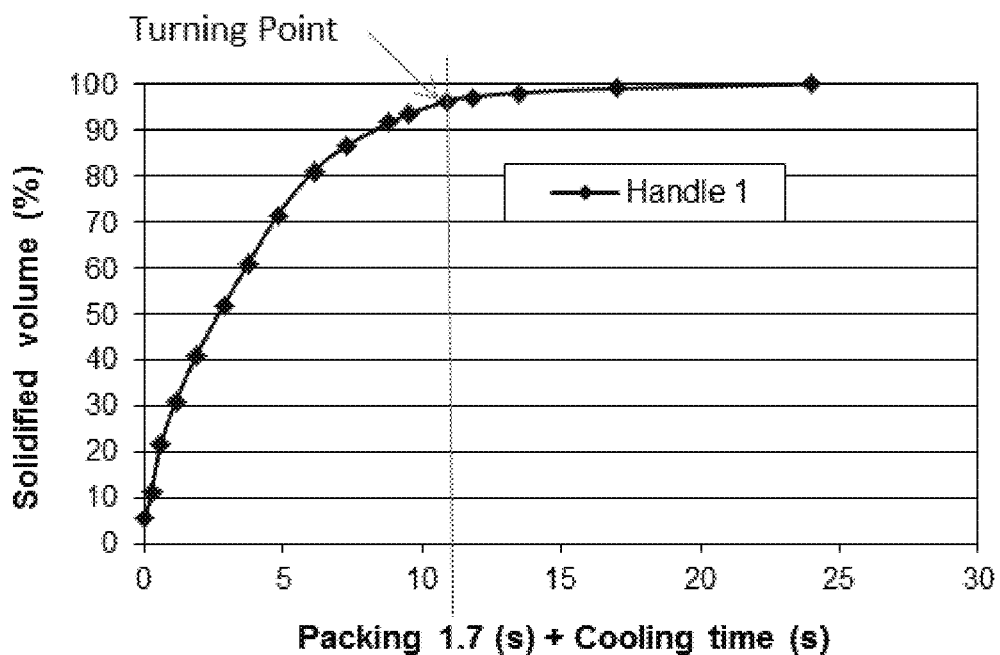
FIG. 3 is the graph of percent solidification versus cooling time of injection molded handle 1 shown in FIG. 1 identifying the target cycle time corresponding to the percent solidification at the turning point found in the graph in FIG. 2.

Once the minimum distance is determined using Equation (2) to identify the Turning Point ($CSI_n$,$V_n$)$_{Turning\ Point}$, the target cycle time corresponding to the data point ($CSI_n$, $V_n$)$_{Turning\ Point}$ can be determined from the data tabulated in Table I below or using the plot in FIG. 1. The cycle time corresponding to the solidified volume percentage at the Turning Point ($CSI_n$,$V_n$)$_{Turning\ Point}$ in FIG. 2 is located on the curve in FIG. 1. The plot in FIG. 3 illustrates how the plot in FIG. 1 of Solidified volume vs. Cooling Time is used to determine the target cycle time by drawing a vertical line through the point on the curve where the solidified volume percentage ($V_n$) corresponds to the solidified volume percentage ($V_n$)$_{Turning\ Point}$ at the Turning Point ($CSI_n$, $V_n$)$_{Turning\ Point}$ in FIG. 2.

TABLE I

| Time (Seconds) | CSI | Melt Volume % | Distance |
| --- | --- | --- | --- |
| 0 | 0.17837 | 5.4 | 94.60017 |
| 0.25 | 0.13259 | 11.24 | 88.76010 |

TABLE I-continued

| Time (Seconds) | CSI | Melt Volume % | Distance |
|---|---|---|---|
| 0.58 | 0.24849 | 21.61 | 78.39039 |
| 1.14 | 0.30417 | 31 | 69.00067 |
| 1.87 | 0.37704 | 41 | 59.00120 |
| 2.85 | 0.40440 | 51.83 | 48.17170 |
| 3.74 | 0.41667 | 61 | 39.00223 |
| 4.79 | 0.56519 | 71.5 | 28.50560 |
| 6.08 | 0.90343 | 81.01 | 19.01148 |
| 7.24 | 1.24046 | 86.36 | 13.69629 |
| 8.8 | 1.60088 | 91.6 | 8.55119 |
| 9.53 | 2.03869 | 93.5 | 6.81221 |
| 10.9* | 4.16667 | 96.3 | 5.57235 |
| 11.8 | 8.59375 | 97.2 | 9.03839 |
| 13.45 | 14.79167 | 98 | 14.92627 |
| 17 | 29.16667 | 99 | 29.18380 |
| 24 | | 100 | 0.00000 |

The data provided in Table I reveals a target cycle time of 10.9 seconds for handle 1 which was determined to be close to the actual production cooling time of 12.0 seconds. It is interesting to note that subsequent to the target cycle time, it actually takes an additional 12 seconds to solidify the last 3% of the melt volume. This is because a solidified shell has been developed on the outside of the handle, and the heat exchange between the plastic material and the steel mold becomes less efficient. In addition, it takes longer distance for the heat to transfer from the center of the handle to the outside surface. For this reason, it was found that it was not necessary to achieve 100% solidification prior to removing the injection molded handle from the mold.

Figure 4:
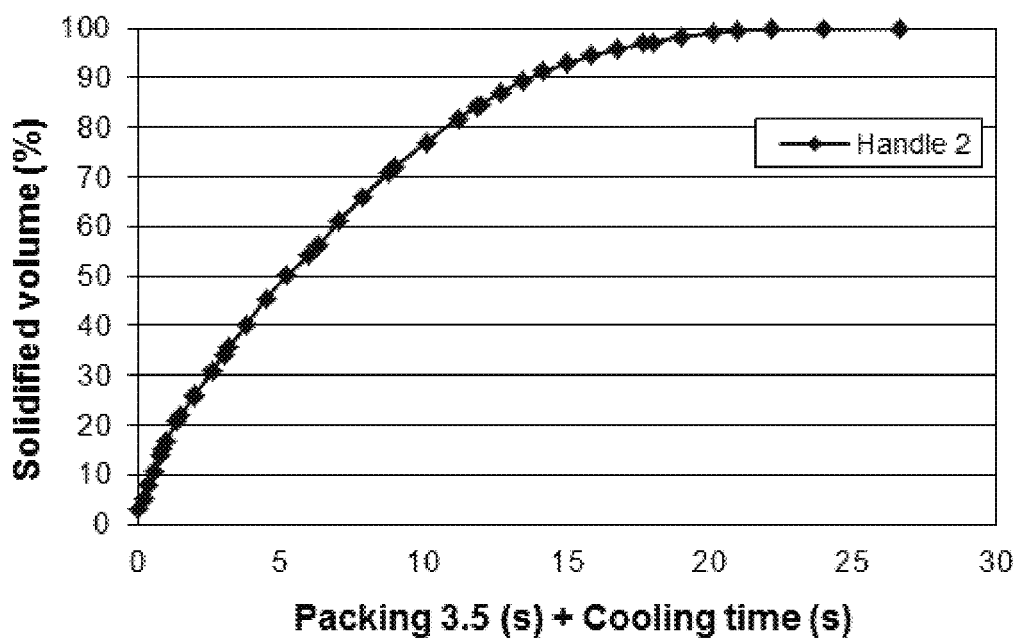
FIG. 4 is a graph of percent solidification versus cooling time of injection molded handle 2.
Figure 5:
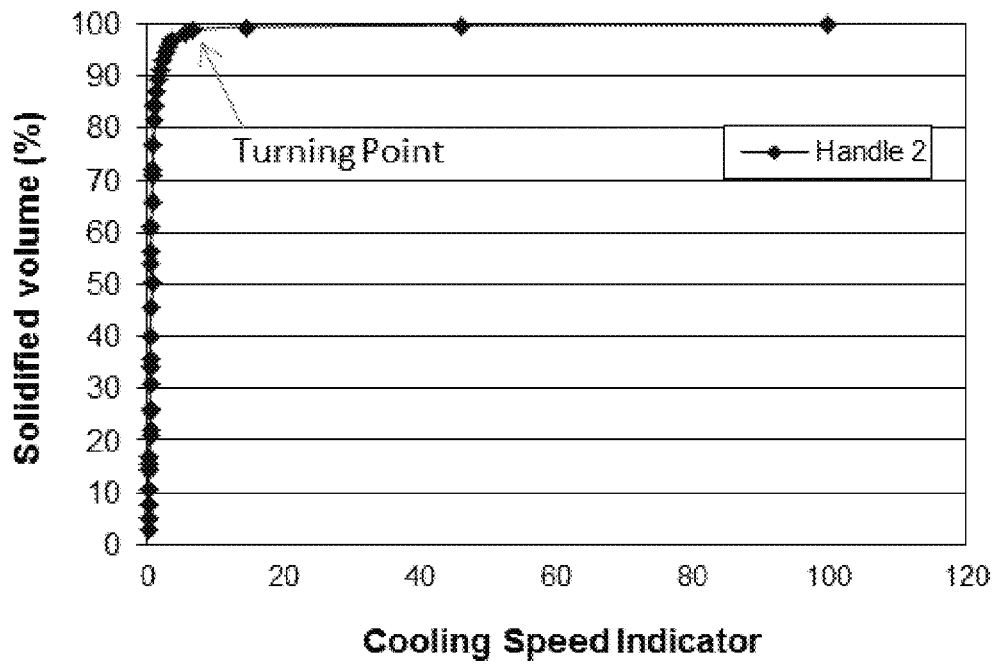
FIG. 5 is a graph of percent solidification versus cooling speed indicator for injection molded handle 2 identifying the turning point.
Figure 6:
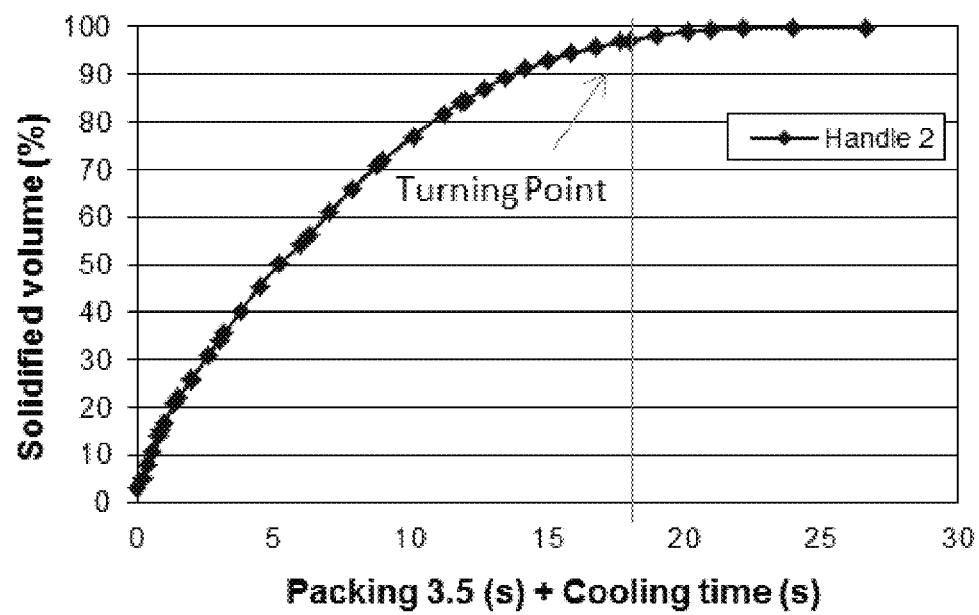
FIG. 6 is the graph of percent solidification versus cooling time of injection molded handle 2 shown in FIG. 4 identifying the target cycle time corresponding to the percent solidification at the turning point found in the graph in FIG. 5.

This learning was applied to a second handle, handle 2. Handle 2's solidification history graph is shown in FIG. 4. The target cycle time can be identified using FIG. 5 which shows the turning point corresponding to 97.2% solidification at a Cooling Speed Indicator of 3.6. From FIG. 6, the target cycle time corresponding to 97.2% solidification is 18 seconds. The target cycle time was determined to be close to the actual production cycle time of 18.5 seconds.

Regarding all numerical ranges disclosed herein, it should be understood that every maximum numerical limitation given throughout this specification includes every lower numerical limitation, as if such lower numerical limitations were expressly written herein. In addition, every minimum numerical limitation given throughout this specification will include every higher numerical limitation, as if such higher numerical limitations were expressly written herein. Further, every numerical range given throughout this specification will include every narrower numerical range that falls within such broader numerical range and will also encompass each individual number within the numerical range, as if such narrower numerical ranges and individual numbers were all expressly written herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of determining a target cycle time for injection molding a production part, comprising the steps of:
   a. creating a computer based model of an injection molded part;
   b. creating a computer based model of a mold for an injection molded part;
   c. ascertaining the solidified volume percentage ($V_n$) as a function of cooling time ($T_n$) data for solidification of the injection molded part from $V_0$=0% to $V_{total}$=100%;
   d. calculating a cooling speed indicator ($CSI_n$) for each solidified volume percentage as a function of time data point ($T_n, V_n$);
   e. determining the solidified volume percentage ($V_n$) as a function of a cooling speed indicator ($CSI_n$) data, ($CSI_n, V_n$), from $V_0$=0% to $V_{total}$=100%;
   f. determining a Turning Point ($CSI_n, V_n$)$_{Turning\ Point}$ for solidified volume percentage ($V_n$) as a function of a cooling speed indicator ($CSI_n$) data;
   g. determining a target cycle time ($T_n$) corresponding to the solidified volume percentage ($V_n$) at the Turning Point; and
   h. applying the target cycle time to the production molded part.

2. The method according to claim 1 wherein $$CSI_n = \frac{(Tn - Tn-1)/Ttotal}{Vn - Vn-1/Vtotal}.$$

3. The method according to claim 2 wherein the Turning Point, ($CSI_n, V_n$)$_{Turning\ Point}$, is a data point, ($CSI_n, V_n$), having a minimum value defined by $$\sqrt[2]{(CSIn)^2 + (100 - Vn)^2}.$$

4. The method according to claim 2 further comprising the step of:
   a. producing a first graph of solidified volume percentage ($V_n$) as a function of cooling time ($T_n$).

5. The method according to claim 4 further comprising the step of:
   a. producing a second graph of the solidified volume percentage ($V_n$) as a function of a cooling speed indicator ($CSI_n$).

6. The method according to claim 5 further comprising the step of:
   a. determining a Turning Point on the second graph for solidified volume percentage ($V_n$) and a cooling speed indicator ($CSI_n$).

7. The method according to claim 6 further comprising the step of:
   a. determining a target cycle time by finding the cycle time ($T_n$) on the first graph corresponding to the solidified volume percentage ($V_n$) at the Turning Point on the second graph.

8. The method according to claim 6 wherein the Turning Point ($V_n$, $CSI_n$)$_{Turning\ Point}$ is the point having a minimum distance to a data point defined by solidified volume percentage ($V_n$)=($V_{total}$)=100% and $CSI_n$=$CSI_0$=0 wherein $$distance = \sqrt[2]{(CSIn)^2 + (100-Vn)^2}.$$

9. A method of determining a target cycle time for injection molding a production part, comprising the steps of:
   a. creating a computer based model of an injection molded part;
   b. creating a computer based model of a mold for an injection molded part;
   c. ascertaining the solidified volume percentage ($V_n$) as a function of cooling time ($T_n$) data for solidification of an injection molded part from $V_0$=0% to $V_{total}$=100%;
   d. calculating a cooling speed indicator ($CSI_n$) for each solidified volume percentage as a function of time data point ($T_n$,$V_n$), where $$CSI_n = \frac{(Tn - Tn-1)/Ttotal}{Vn - Vn-1/Vtotal};$$

e. determining the solidified volume percentage (V) as a function of a cooling speed indicator (CSI) data, (CSI,V) from $V_0$=0% to $V_{total}$=100% ;
   f. determining a Turning Point ($CSI_n$,$VO_{Turning\ Point}$ for solidified volume percentage ($V_n$) as a function of a cooling speed indicator (CSI) data, wherein the Turning Point, ($CSI_n$,$V_n$)$_{Turning\ Point}$, is a data point, ($CSI_n$,$V_n$), having a minimum value defined by $$\sqrt[2]{(CSIn)^2 + (100-Vn)^2};$$

g. determining a target cycle time (TO corresponding to the solidified volume percentage ($V_n$) at the Turning Point; and
   h. applying the target cycle time to the production molded part.

10. The method according to claim 9 further comprising the step of:
    a. producing a first graph of solidified volume percentage ($V_n$) as a function of cooling time ($T_n$).

11. The method according to claim 10 further comprising the step of:
    a. producing a second graph of the solidified volume percentage ($V_n$) as a function of a cooling speed indicator ($CSI_n$).

12. The method according to claim 11 further comprising the step of:
    a. determining a Turning Point on the second graph for solidified volume percentage ($V_n$) and a cooling speed indicator ($CSI_n$) wherein the Turning Point ($V_n$, $CSI_n$)$_{Turning\ Point}$ is the point having a minimum distance to a data point defined by solidified volume percentage ($V_n$)=($V_{total}$)=100% and $CSI_n$=$CSI_0$=0 wherein distance=

$$distance = \sqrt[2]{(CSIn)^2 + (100-Vn)^2}.$$

13. The method according to claim 12 further comprising the step of:
    a. determining a target cycle time by finding the cycle time ($T_n$) on the first graph corresponding to the solidified volume percentage ($V_n$) at the Turning Point on the second graph.

* * * * *

UNITED STATES PATENT AND TRADEMARK OFFICE
CERTIFICATE OF CORRECTION

PATENT NO. : 9,475,221 B2
APPLICATION NO. : 14/568323
DATED : October 25, 2016
INVENTOR(S) : Sean Wang It is certified that error appears in the above-identified patent and that said Letters Patent is hereby corrected as shown below:

On the Title Page

Item (54) Title reads: Method Of Predicing Injection Molding Cycle Time
Please correct title to read: --Method of Predicting Injection Molding Cycle Time--

In the Specification

Column 1 Lines 1-2
Title reads: Method Of Predicing Injection Molding Cycle Time
Please correct title to read: --Method of Predicting Injection Molding Cycle Time--

Signed and Sealed this
Seventh Day of November, 2017

Joseph Matal
*Performing the Functions and Duties of the*
*Under Secretary of Commerce for Intellectual Property and*
*Director of the United States Patent and Trademark Office*